US010353164B2

(12) United States Patent
Lane et al.

(10) Patent No.: US 10,353,164 B2
(45) Date of Patent: Jul. 16, 2019

(54) FIBER OPTIC TRANSITION ASSEMBLIES

(71) Applicant: AFL Telecommunications LLC, Duncan, SC (US)

(72) Inventors: David James Lane, Chesnee, SC (US); Shirley Ball, Greer, SC (US); Wilfred Courchaine, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/634,609

(22) Filed: Jun. 27, 2017

(65) Prior Publication Data
US 2018/0372981 A1    Dec. 27, 2018

(51) Int. Cl.
*G02B 6/38*    (2006.01)
*G02B 6/44*    (2006.01)

(52) U.S. Cl.
CPC ......... *G02B 6/4477* (2013.01); *G02B 6/3821* (2013.01); *G02B 6/3885* (2013.01); *G02B 6/3887* (2013.01); *G02B 6/4432* (2013.01); *G02B 6/4471* (2013.01); *G02B 6/4475* (2013.01); *G02B 6/4476* (2013.01); *G02B 6/4482* (2013.01)

(58) Field of Classification Search
CPC .. G02B 6/4477; G02B 6/3821; G02B 6/3885; G02B 6/3887; G02B 6/4432; G02B 6/4476; G02B 6/4482
USPC .......................................... 385/100, 113, 137
See application file for complete search history.

(56) References Cited

U.S. PATENT DOCUMENTS

| 5,157,749 | A  | 10/1992 | Briggs |
| 5,838,861 | A  | 11/1998 | Bunde |
| 5,903,693 | A  | 5/1999  | Brown |
| 6,278,831 | B1 | 8/2001  | Henderson et al. |
| 6,438,299 | B1 | 8/2002  | Brown et al. |
| 6,738,555 | B1 | 5/2004  | Cooke et al. |
| 6,771,861 | B2 | 8/2004  | Wagner et al. |
| 6,909,828 | B2 | 6/2005  | Zimmel et al. |
| 7,035,510 | B2 | 4/2006  | Zimmel et al. |
| 7,090,406 | B2 | 8/2006  | Melton et al. |
| 7,090,407 | B2 | 8/2006  | Melton et al. |
| 7,127,143 | B2 | 10/2006 | Elkins, II et al. |

(Continued)

OTHER PUBLICATIONS

AFL Telecommunications LLC; International Patent Application No. PCT/US2018/037282; International Search Report; dated Sep. 17, 2018; (2 pages).

*Primary Examiner* — Ryan A Lepisto
(74) *Attorney, Agent, or Firm* — Dority & Manning, P.A.

(57) ABSTRACT

A fiber optic transition assembly includes a drop cable including a plurality of optical fibers and an outer jacket. The assembly further includes a plurality of furcation cables, each of the plurality of furcation cables surrounding an extended portion of one of the plurality of optical fibers. The assembly further includes a plurality of biasing members, each of the plurality of biasing members surrounding a first end portion of each of the plurality of furcation cables. The assembly further includes a transition member defining an interior, wherein a second end of the outer jacket and first ends of each of the plurality of furcation cables are disposed within the interior, each of the plurality of biasing members is at least partially disposed within the interior, and the plurality of optical fibers extend from the outer jacket to the furcation cables within the interior.

20 Claims, 4 Drawing Sheets

(56) References Cited

U.S. PATENT DOCUMENTS

| | | | |
|---|---|---|---|
| 7,270,485 | B1 | 9/2007 | Robinson et al. |
| 7,277,614 | B2 | 10/2007 | Cody et al. |
| 7,280,725 | B2 | 10/2007 | Brown et al. |
| 7,415,181 | B2 | 8/2008 | Greenwood et al. |
| 7,450,804 | B2 | 11/2008 | Elkins, II et al. |
| 7,463,803 | B2 | 12/2008 | Cody et al. |
| 7,494,284 | B2 | 2/2009 | Robinson et al. |
| 7,703,990 | B1 | 4/2010 | de Jong et al. |
| 7,955,004 | B2 | 6/2011 | DiMarco |
| 8,155,490 | B2 | 4/2012 | de Jong et al. |
| 8,172,465 | B2 | 5/2012 | Kleeberger |
| 8,275,228 | B2 * | 9/2012 | Livingston ............ G02B 6/4441 385/134 |
| 8,285,104 | B2 | 10/2012 | Davis et al. |
| 8,380,029 | B2 | 2/2013 | Cline et al. |
| 8,401,353 | B2 | 3/2013 | Barker et al. |
| 8,457,461 | B2 | 6/2013 | Ott |
| 8,571,367 | B2 | 10/2013 | Van Der Meulen et al. |
| 8,718,425 | B2 | 5/2014 | Pina et al. |
| 8,737,786 | B1 | 5/2014 | Compton et al. |
| 8,818,156 | B2 | 8/2014 | Nave |
| 8,837,894 | B2 * | 9/2014 | Holmberg ............ G02B 6/445 385/135 |
| 8,917,968 | B2 | 12/2014 | Cooke et al. |
| 8,958,673 | B2 | 2/2015 | Cline et al. |
| 9,069,152 | B2 | 6/2015 | Smith |
| 9,075,219 | B2 | 7/2015 | Blockley et al. |
| 9,217,828 | B2 | 12/2015 | Wright et al. |
| 9,235,021 | B2 | 1/2016 | Islam |
| 9,279,951 | B2 * | 3/2016 | McGranahan ....... G02B 6/4453 |
| 9,405,084 | B2 | 8/2016 | Hurley et al. |
| 9,411,121 | B2 | 8/2016 | Buff et al. |
| 9,575,277 | B2 | 2/2017 | Bakatsias et al. |
| 2006/0093278 | A1 * | 5/2006 | Elkins, II ............. G02B 6/4473 385/76 |
| 2007/0098339 | A1 * | 5/2007 | Bringuier ........... G02B 6/02357 385/106 |
| 2009/0238531 | A1 * | 9/2009 | Holmberg .............. G02B 6/445 385/135 |
| 2010/0104278 | A1 * | 4/2010 | Livingston ........... G02B 6/4441 398/41 |
| 2012/0039571 | A1 | 2/2012 | Ciechomski |
| 2013/0004126 | A1 * | 1/2013 | Wu ..................... G02B 6/4472 385/77 |
| 2013/0034333 | A1 * | 2/2013 | Holmberg .............. G02B 6/445 385/135 |
| 2013/0259434 | A1 | 10/2013 | Bringuier et al. |
| 2014/0133822 | A1 * | 5/2014 | de Los Santos Campos ............. G02B 6/44 385/137 |
| 2015/0003790 | A1 * | 1/2015 | Wu ..................... G02B 6/3887 385/81 |
| 2015/0153532 | A1 * | 6/2015 | Holmberg .............. G02B 6/445 385/135 |
| 2015/0362690 | A1 | 12/2015 | Harwath |
| 2017/0003468 | A1 | 1/2017 | Hurley et al. |
| 2017/0227719 | A1 * | 8/2017 | Zimmel ............... G02B 6/3885 |

\* cited by examiner

FIBER OPTIC TRANSITION ASSEMBLIES

FIELD

The present disclosure relates generally to fiber optic communications networks, and more particularly fiber optic transition assemblies for use in fiber optic communications networks.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a premises (i.e. FTTP).

Drop cables are utilized to connect the end user to the distribution cable and thus the fiber optic network. However, it can be difficult and time consuming to deploy such drop cables, due to the outdoor environment and challenges inherent thereto. For example, such drop cables and associated connectors, etc., must be environmentally sealed, rugged, and resistant to rodents, chemicals, etc.

One approach to deploying such drop cables is to utilize a transition assembly, in which the two optical fibers from the drop cable are split into individual cables via a transition component. These individual cables are terminated with connectors that connect the optical fibers to the end user destinations. However, such known transition assemblies may have strain issues, resulting in significant losses which are evident in tests such as transmission tests with applied loadings. Further, the sealing of such known transition assemblies may be inadequate.

Accordingly, improved fiber optic transition assemblies are desired. In particular, fiber optic transition assemblies which include improved strain relief features and/or sealing features would be advantageous.

BRIEF DESCRIPTION

Aspects and advantages of the invention will be set forth in part in the following description, or may be obvious from the description, or may be learned through practice of the invention.

In accordance with one embodiment, a fiber optic transition assembly is provided. The fiber optic transition assembly includes a drop cable including a plurality of optical fibers and an outer jacket, the outer jacket extending between a first end and a second end, each of the plurality of optical fibers extending from the second end of the outer jacket. The fiber optic transition assembly further includes a plurality of furcation cables, each of the plurality of furcation cables surrounding an extended portion of one of the plurality of optical fibers, each of the plurality of furcation cables extending between a first end and a second end. The fiber optic transition assembly further includes a plurality of biasing members, each of the plurality of biasing members surrounding a first end portion of each of the plurality of furcation cables. The fiber optic transition assembly further includes a transition member defining an interior, wherein the second end of the outer jacket and the first ends of each of the plurality of furcation cables are disposed within the interior, each of the plurality of biasing members is at least partially disposed within the interior, and the plurality of optical fibers extend from the outer jacket to the furcation cables within the interior.

In accordance with another embodiment, a fiber optic transition assembly is provided. The fiber optic transition assembly includes a drop cable including a plurality of optical fibers and an outer jacket, the outer jacket extending between a first end and a second end, each of the plurality of optical fibers extending from the second end of the outer jacket. The fiber optic transition assembly further includes a plurality of furcation cables, each of the plurality of furcation cables surrounding an extended portion of one of the plurality of optical fibers, each of the plurality of furcation cables extending between a first end and a second end. The fiber optic transition assembly further includes a transition member defining an interior, wherein the second end of the outer jacket and the first ends of each of the plurality of furcation cables are disposed within the interior, each of the plurality of biasing members is at least partially disposed within the interior, and the plurality of optical fibers extend from the outer jacket to the furcation cables within the interior. The fiber optic transition assembly further includes a plurality of connectors, each of the plurality of connectors including a body extending between a first end and a second end, wherein the second end of each of the plurality of furcation cables is disposed within one of the plurality of connectors and each of the plurality of optical fibers extends from the second end of one of the plurality of furcation cables within each of the plurality of connectors. The fiber optic transition assembly further includes a plurality of biasing members, each of the plurality of biasing members surrounding a second end portion of each of the plurality of furcation cables.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
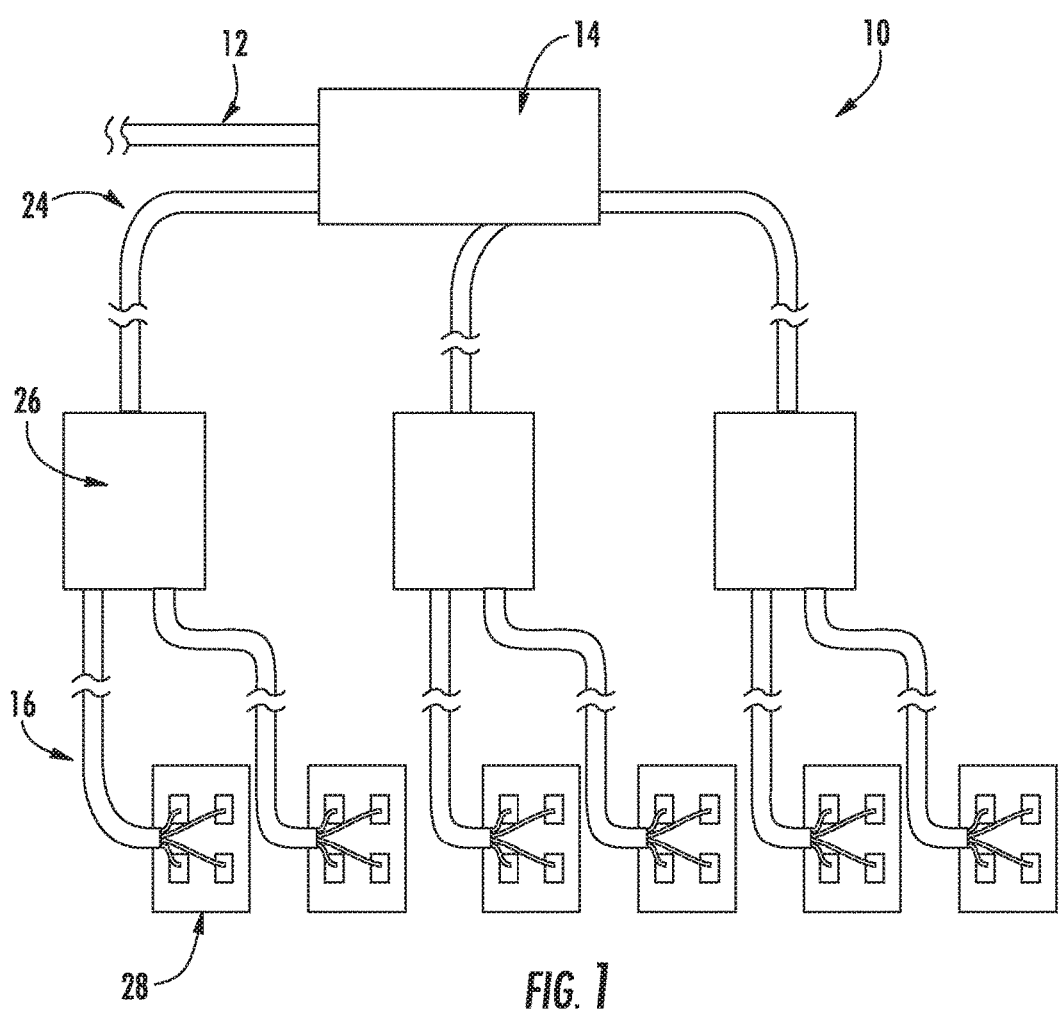
FIG. 1 is a schematic illustration of a known fiber optic communications network.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a portion of a known fiber optic communications network 10 which includes a fiber optic distribution cable 12 is shown. One or more mid-span access locations are provided along the length of the distribution cable 12. The mid-span access location may be enclosed and protected from exposure to the environment by a conventional closure 14. The fiber optic communications network 10 may include a fiber optic distribution cable 12 having a plurality of mid-span access locations at branch points spaced along the length of the distribution cable, each providing access to at least one, and preferably, a plurality of optical fibers of the fiber optic network. Thus, in the embodiments shown, the distribution cable 12 may provide multiple locations for joining stub cables 24 of multi-port optical connection terminals 26 to the distribution cable 12 at each mid-span access location.

In the fiber optic network 10 as illustrated, pre-terminated optical fibers of the distribution cable 12 provided at the mid-span access location are routed out of the distribution cable and spliced to respective optical fibers of a stub cable 24 extending from a multi-port optical connection terminal 26. The optical fibers of the stub cable 24 may enter the closure 14 through a suitable cable port provided through an exterior wall, for example an end wall, of the closure 14. The stub cable 24 includes at least one, and preferably a plurality of optical fibers disposed within a protective cable sheath. The stub cable 24 may, for example, be any known fiber optic cable which includes at least one optical fiber and having a fiber count equal to or greater than that of a drop cable 16 to be connected to the multi-port optical connection terminal 26 and equal to or less than that of the distribution cable 12.

The stub cable 24 may extend from the closure 14 into a terminal 26. The optical fibers of the stub cable 24 within the terminal 26 may be connectorized. One or more connectorized drop cables 16 may be interconnected with the connectorized optical fibers of the stub cable 24, i.e. in terminal 26. The drop cables 16 may include at least one single mode or multimode optical fiber of any type optically connected to a single fiber or multi-fiber optical connector in a conventional manner. The other ends of the drop cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, one or more stub cables 24 extends from the closure 14 to a terminal 26 positioned at a distance from the mid-span access location, such as a telephone pole, hand-hole, vault or pedestal (not shown) in the fiber optic network 10. Each drop cable 16 extends from a terminal 26 to an outside plant connection terminal 28 located at a delivery point such as a subscriber premises.

It should be understood that the present disclosure is not limited to the above-described embodiment of a fiber optic network 10, and rather that any suitable fiber optic network 10 is within the scope and spirit of the present disclosure.

Figure 2:
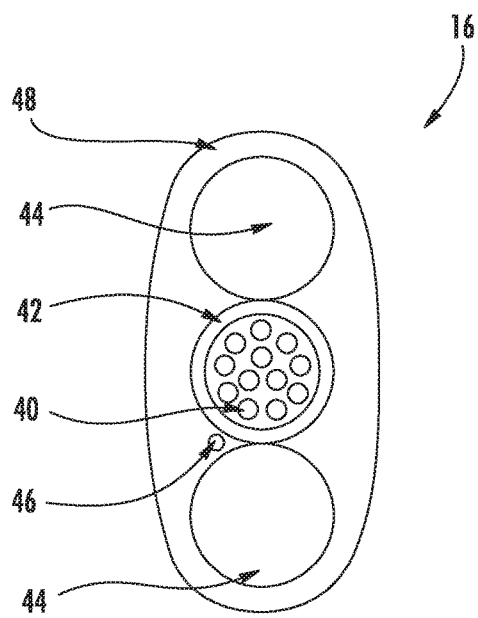
FIG. 2 is a cross-sectional view of a drop cable in accordance with embodiments of the present disclosure.
Figure 3:
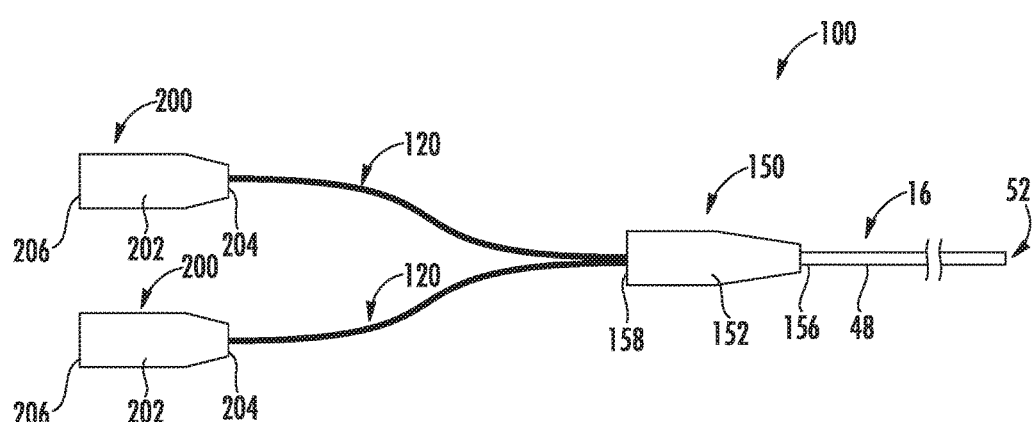
FIG. 3 is a schematic illustration of a transition assembly in accordance with embodiments of the present disclosure.
Figure 4:
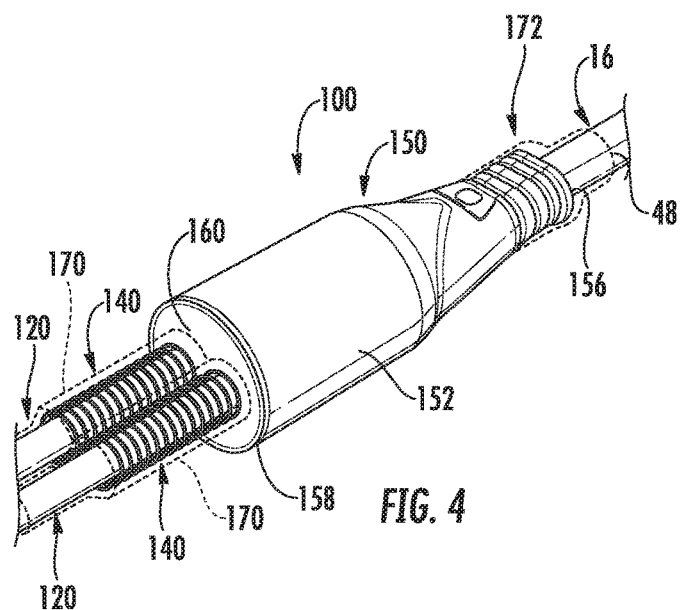
FIG. 4 is a perspective view of a portion of a transition assembly, including a transition member, in accordance with embodiments of the present disclosure.
Figure 5:
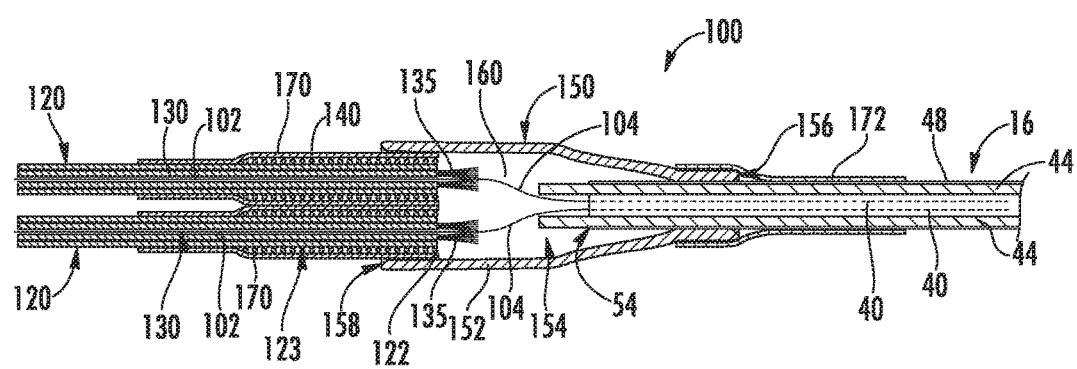
FIG. 5 is a cross-sectional view of a portion of a transition assembly, including a transition member, in accordance with embodiments of the present disclosure.
Figure 6:
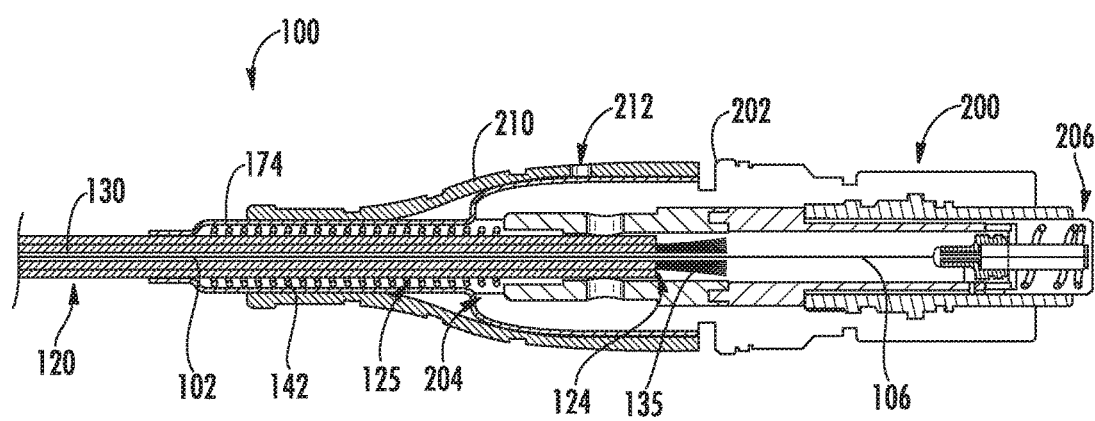
FIG. 6 is a cross-sectional view of a portion of a transition assembly, including a connector, in accordance with embodiments of the present disclosure.

Referring now to FIG. 2, a drop cable 16 in accordance with embodiments of the present disclosure is illustrated. As shown, drop cable 16 may include a plurality of optical fibers 40 disposed within a buffer tube 42. In some embodiments, a gel may be provided in the buffer tube 42 surrounding the optical fibers 40. Drop cable 16 may further include strength rods 44, which in exemplary embodiments may be water blocking dielectric strength rods. A water blocking thread 46 may additionally be provided in the drop cable 16. An outer jacket 48 may surround the strength rods 44, buffer tube 42 and water blocking thread 46. The jacket 48 may, for example, be formed from a UV resistant material. The jacket 48 may include and form an outermost layer and exterior surface of the drop cable 16. In exemplary embodiments as shown, the drop cable 16 generally, and thus the jacket 48 thereof, may have an oval-shaped cross-sectional profile. Accordingly, the cross-sectional profile may have a major radius and a minor radius which are not equal (with the major radius being greater than the minor radius), as opposed to a circular cross-sectional profile which has a constant radius. Alternatively, however, drop cable 16 may have a circular cross-sectional profile.

It should be understood that the present disclosure is not limited to the above-described embodiment of drop cable 16, and rather that any suitable drop cable is within the scope and spirit of the present disclosure.

Referring now to FIGS. 3 through 6, embodiments of a fiber optic transition assembly 100 and components thereof are illustrated. The transition assembly 100 may include a drop cable 16, which may include a plurality of optical fibers 40 and an outer jacket 48. Further, in exemplary embodiments, drop cable 16 may include one or more strength rods 44 and/or other suitable components as discussed above. Outer jacket 48 may extend between a first end 52 and a second end 54, and each optical fiber 40 may extend from the second end 54 of the outer jacket 48 as shown. Further, in some embodiments, the strength rods 44 and/or other components may also extend from the second end 54.

Assembly 100 may further include a plurality of furcation cables 120. Each furcation cable 120 may extend between a first end 122 and a second end 124, as illustrated. Further, as discussed, an extended portion 102 of an optical fiber 40 may extend into each furcation cable 120, such as through the first end 122 of a furcation cable 120. Accordingly, each furcation cable 120 may include an optical fiber 40 (from drop cable 16) therein and may thus surround such extended portion 102 of such optical fiber 40. While in exemplary embodiments only a single optical fiber 40 extends into each furcation cable 120, in alternative embodiments a plurality of optical fibers 40 may extend into each furcation cable 120.

Two or more furcation cables 120 may be utilized in accordance with the present disclosure. In exemplary embodiments, more than two furcation cables 120, such as three, four, or more, may be utilized. Assemblies 100 in accordance with the present disclosure advantageously facilitate the use of more than two furcation cables 120 if desired or requires.

In some embodiments, an inner furcation tube 130 may additionally surround the extended portion 102 of each optical fiber 40. The inner furcation tube 130 may serve to protect the optical fiber 40 as it exits the outer jacket 48 at the second end 54 thereof. Such inner furcation tube 130 may thus be disposed between the optical fiber 40 and furcation cable 120. Additionally, in some embodiments, strength members 135, such as fibers (in exemplary embodiments aramid fibers) are disposed within each furcation cable 120.

Assembly 100 may further include a plurality of first biasing members 140. Such biasing members 140 are, in exemplary embodiments, springs, such as coil springs as shown. Such biasing member 140 may surround a first end portion 123 of the furcation cable 120. Such first end portion 123 may be a portion that is relatively proximate to the first end 122 and distal from the second end 124 along the length of the furcation cable 120. In exemplary embodiments, the first end portion 123 may include the first end 122. Biasing members 140 may advantageously provide strain relief to the furcation cables 120 during use as the cables 120 are moved and bent into various positions.

Assembly 100 further includes a transition member 150. Transition member 150 provides a transition between the drop cable 16 and the furcation cables 120, and more specifically provides a location for the optical fibers 40 to extend from the drop cable 16 into the furcation cables 120, such that the optical fibers 40 are advantageously protected in this transition.

Transition member 150 includes a body 152 which defines an interior 154. The transition member 150, such as the body 152 thereof, extends between a first end 156 and a second end 158. In exemplary embodiments as shown, the second end 158 may have a cross-sectional area that is greater than a cross-sectional area of the first end 156. In exemplary embodiments, transition member 150 may be formed from a plastic, such as a blend which includes nylon and/or poly(p-phenylene oxide). In exemplary embodiments, such material may include reinforcing fibers, such as glass fibers. Alternatively, other suitable materials may be utilized.

The second end 54 of the outer jacket 48 may be disposed within the interior 154. For example, in exemplary embodiments, the drop cable 16 (and outer jacket 48 thereof) enters the transition member 150 through the first end 156 thereof. Further, the first ends 122 of each furcation cable 120 may be disposed within the interior 154. For example, in exemplary embodiments, each furcation cable 120 enters the transition member 150 through the second end 158 thereof. Additionally, each biasing member 140 may be at least partially disposed within the interior 154. For example, in exemplary embodiments, each biasing member 140 enters the transition member 150 through the second end 158 thereof. Accordingly, each biasing member 140 extends from the transition member 150, such as from the second end 158 thereof. Further, the first end portion 123 may thus extend from the transition member 150.

Optical fibers 40 may extend from the outer jacket 48, such as the second end 54 thereof, to and into furcation cables 120, such as the first ends 122 thereof, within the interior 154. In some embodiments, a portion of such optical fibers 40 (i.e. an exposed portion 104 of the extended portion 102) may be exposed within the interior 154. Such exposed portion 104 is not surrounded by either outer jacket 48 or a furcation cable 120, although such exposed portion 104 may be surrounded by an inner furcation tube 130. Alternatively, extended portions 102 may extend directly from outer jacket 48 into furcation cables 120, with no exposed portion 104 being evident.

Further, in some embodiments, strength rods 44 may extend from the outer jacket 48, such as the second end 54 thereof, into the interior 154. Such strength rods 44 may, for example, terminate in the interior 154. Further, such strength rods 44 do not enter the furcation cables 120.

In exemplary embodiments, an adhesive 160 may be disposed within the interior 154. Adhesive 154 may surround the other components within the interior 154, such as the cable 120, outer jacket 48, optical fibers, 40, inner furcation tubes 130, etc., and may advantageously provide a seal to protect such components from the exterior environment. In some exemplary embodiments, the adhesive 160 may be a suitable epoxy or suitable urethane material. In some embodiments, a material with a relatively higher viscosity may be utilized. For example, a material having a viscosity of between 50,000 and 60,000 cP at 25° C., which may in some embodiments be an epoxy, may be utilized. In other embodiments, a material with a relatively lower viscosity may be utilized. Lower viscosity materials may be particularly advantageous, as they provide better flow, thus resulting in improved sealing and moisture ingress prevention. For example, a material having a viscosity of between 400 and 900 cP at 25° C., such as between 500 and 800 cP at 25° C., such as between 600 and 700 cP at 25° C., such as 650 cP at 25° C., may be utilized. In exemplary embodiments, the material may be a urethane.

Assembly 100 may further include a plurality of first heat shrink tubes 170. Each first heat shrink tube 170 may surround and protect various other components of the assembly 100. For example, a first heat shrink tube 170 may surround the first end portion 123 of each furcation cable 120. Further, such first heat shrink tube 170 may surround the biasing member 140 that surrounds such first end portion 123. The first heat shrink tube 170 may fully or partially surround the biasing member 140 (such as fully surround the portion of the biasing member 140 outside the transition member 150), and may contact the biasing member 140 as well as a portion of the first end portion 123 or furcation cable 120 generally. Further, in exemplary embodiments, each such heat shrink tube 170 may be partially disposed within interior 154 and thus extend from interior 154, such as from the second end 158 of the transition member 150. Such heat shrink tubes 170 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include a second heat shrink tube 172. The second heat shrink tube 172 may surround and protect various other components of the assembly 100. For example, the second heat shrink tube 172 may surround a portion of the drop cable 16 (such as the outer jacket 48 thereof), that extends from the transition member 150, such as the first end 156 thereof. The second heat shrink tube 172 may further surround a portion of the transition member 150, such as including the first end 156. Such heat shrink tube 172 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include a plurality of connectors 200. Any suitable connectors may be utilized. Each optical fiber 40 may terminate in a connector 200, such as in the body 202 thereof, as shown. In general, a connector 200 may include a body 202 which extends between a first end 204 and a second end 206.

Each connector 200 may be connected to a furcation cable 120, such that the second end 124 of the furcation cable 120 is disposed within such connector 200. For example, the furcation cable 120 may enter the connector 200 through the first end 204 thereof. Further, the optical fiber(s) 40 within such furcation cable 120 may extend from the second end 124 thereof within such connector 200, and terminate within such connector 200. Accordingly, an end portion 106 of each optical fiber 40 may be disposed within a connector 200.

In exemplary embodiments, assembly 100 further includes a plurality of second biasing members 142. Such second biasing members 142 are, in exemplary embodiments, springs, such as coil springs as shown. Such biasing member 140 may surround a second end portion 125 of the furcation cable 120. Such second end portion 125 may be a portion that is relatively proximate to the second end 124 and distal from the first end 122 along the length of the furcation cable 120. In exemplary embodiments, the second end portion 125 may include the second end 124. Biasing members 142 may advantageously provide strain relief to the furcation cables 120 during use as the cables 120 are moved and bent into various positions.

In exemplary embodiments, as shown, a second biasing member 142 may be at least partially disposed within a connector 200. For example, a second biasing member 142 may extend from a connector 200, such as from the first end 204 thereof. Alternatively, a second biasing member 142 may be entirely external to the associated connector 200.

Assembly 100 may further include a plurality of third heat shrink tubes 174. Each third heat shrink tube 174 may surround and protect various other components of the assembly 100. For example, a third heat shrink tube 174 may surround the second end portion 125 of a furcation cable 120. Further, such third heat shrink tube 174 may surround the biasing member 142 that surrounds such second end portion 125. The third heat shrink tube 174 may fully or partially surround the biasing member 142 (such as fully surround the portion of the biasing member 142 outside the connector 200), and may contact the biasing member 142 as well as a portion of the second end portion 124 or furcation cable 120 generally. Further, in exemplary embodiments, each such heat shrink tube 174 may surround at least a portion of the connector 200, such as including the first end 204. Such heat shrink tubes 174 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include a plurality of boots 210. Each boot 210 may surround and protect a portion of a connector 200 and other various components associate with such connector. For example, the first end 204 of a connector 200 may be disposed within a boot 210, as shown. Further, one or more of an associated third heat shrink tube 174, an associated second biasing member 142, and/or an associated furcation cable 120 (such as the second end portion 125 thereof) may be at least partially disposed within such boot 210.

In some embodiments, one or more slots 212 may be defined in the boot 210. Each slot may extend entirely through a thickness of the boot 210, such that the heat shrink tube 174 is visible through the slot 212. Further, in some embodiments, the heat shrink tubes 174 may be color-coded, such that each heat shrink tube 174 has a different color than other heat shrink tubes 174 in the assembly 100. Such colors may correspond to different optical fibers 40 in the assembly 100, and facilitate easy identification of the optical fiber(s) 40 in each furcation cable 120 and connector 200 by a user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic transition assembly, comprising:
    a drop cable comprising a plurality of optical fibers and an outer jacket, the outer jacket extending between a first end and a second end, each of the plurality of optical fibers extending from the second end of the outer jacket;
    a plurality of furcation cables, each of the plurality of furcation cables surrounding an extended portion of one of the plurality of optical fibers, each of the plurality of furcation cables extending between a first end and a second end;
    a plurality of biasing members, each of the plurality of biasing members surrounding a first end portion of one of the plurality of furcation cables, and the first end portion of each of the plurality of furcation cables surrounded by one of the plurality of biasing members; and
    a transition member defining an interior, wherein the second end of the outer jacket and the first ends of each of the plurality of furcation cables are disposed within the interior, each of the plurality of biasing members is at least partially disposed within the interior, and the plurality of optical fibers extend from the outer jacket to the furcation cables within the interior.

2. The fiber optic transition assembly of claim 1, wherein each of the plurality of biasing members is a coil spring.

3. The fiber optic transition assembly of claim 1, wherein the drop cable further comprises a plurality of strength rods.

4. The fiber optic transition assembly of claim 3, wherein each of the plurality of strength rods extends from the second end of the outer jacket into the interior.

5. The fiber optic transition assembly of claim 1, further comprising a plurality of heat shrink tubes, each of the plurality of heat shrink tubes surrounding the first end portion of one of the plurality of furcation cables and the one of the plurality of biasing members surrounding the first end portion of that furcation cable.

6. The fiber optic transition assembly of claim 1, wherein each of the plurality of biasing members extends from the transition member.

7. The fiber optic transition assembly of claim 1, wherein the transition member extends between a first end and a second end, wherein the drop cable enters the first end of the transition member, and wherein each of the plurality of furcation cables enters the second end of the transition member.

8. The fiber optic transition assembly of claim 7, further comprising a heat shrink tube, the heat shrink tube surrounding the first end of the transition member and a portion of the drop cable extending from the first end of the transition member.

9. The fiber optic transition assembly of claim 1, further comprising an adhesive disposed within the interior.

10. The fiber optic transition assembly of claim 1, further comprising:
a plurality of connectors, each of the plurality of connectors comprising a body extending between a first end and a second end,
wherein the second end of each of the plurality of furcation cables is disposed within one of the plurality of connectors and each of the plurality of optical fibers extends from the second end of one of the plurality of furcation cables within each of the plurality of connectors.

11. The fiber optic transition assembly of claim 10, wherein the plurality of biasing members are a plurality of first biasing members, and further comprising a plurality of second biasing members, each of the plurality of second biasing members surrounding a second end portion of one of the plurality of furcation cables, and the second end portion of each of the plurality of furcation cables surrounded by one of the plurality of second biasing members.

12. The fiber optic transition assembly of claim 11, wherein each of the plurality of second biasing members is at least partially disposed within one of the plurality of connectors.

13. The fiber optic transition assembly of claim 11, wherein each of the plurality of second biasing members is a coil spring.

14. The fiber optic transition assembly of claim 11, further comprising a plurality of heat shrink tubes, each of the plurality of heat shrink tubes surrounding the second end portion of one of the plurality of furcation cables and the one of the plurality of second biasing members surrounding the second end portion of that furcation cable.

15. The fiber optic transition assembly of claim 14, further comprising a plurality of boots, wherein the first end of the body of each of the plurality of connectors is disposed within one of the plurality of boots, and wherein one of the plurality of heat shrink tubes, one of the plurality of second biasing members, and the second end portion of one of the plurality of furcation cables are at least partially disposed within each of the plurality of boots.

16. A fiber optic transition assembly, comprising:
a drop cable comprising a plurality of optical fibers and an outer jacket, the outer jacket extending between a first end and a second end, each of the plurality of optical fibers extending from the second end of the outer jacket;
a plurality of furcation cables, each of the plurality of furcation cables surrounding an extended portion of one of the plurality of optical fibers, each of the plurality of furcation cables extending between a first end and a second end;
a plurality of biasing members, each of the plurality of biasing members surrounding a second end portion of one of the plurality of furcation cables, and the second end portion of each of the plurality of furcation cables surrounded by one of the plurality of biasing members;
a transition member defining an interior, wherein the second end of the outer jacket and the first ends of each of the plurality of furcation cables are disposed within the interior, each of the plurality of biasing members is at least partially disposed within the interior, and the plurality of optical fibers extend from the outer jacket to the furcation cables within the interior; and
a plurality of connectors, each of the plurality of connectors comprising a body extending between a first end and a second end, wherein the second end of each of the plurality of furcation cables is disposed within one of the plurality of connectors and each of the plurality of optical fibers extends from the second end of one of the plurality of furcation cables within each of the plurality of connectors.

17. The fiber optic transition assembly of claim 16, wherein each of the plurality of biasing members is a coil spring.

18. The fiber optic transition assembly of claim 16, further comprising a plurality of heat shrink tubes, each of the plurality of heat shrink tubes surrounding the second end portion of one of the plurality of furcation cables and the one of the plurality of biasing members surrounding the second end portion of that furcation cable.

19. The fiber optic transition assembly of claim 18, further comprising a plurality of boots, wherein the first end of the body of each of the plurality of connectors is disposed within one of the plurality of boots, and wherein one of the plurality of heat shrink tubes, one of the plurality of biasing members, and the second end portion of one of the plurality of furcation cables are at least partially disposed within each of the plurality of boots.

20. The fiber optic transition assembly of claim 18, wherein the heat shrink tubes are color-coded.

\* \* \* \* \*